United States Patent
Wu et al.

(10) Patent No.: US 12,014,273 B2
(45) Date of Patent: Jun. 18, 2024

(54) LOW PRECISION AND COARSE-TO-FINE DYNAMIC FIXED-POINT QUANTIZATION DESIGN IN CONVOLUTION NEURAL NETWORK

(71) Applicant: Kneron (Taiwan) Co., Ltd., Taipei (TW)

(72) Inventors: Jie Wu, San Diego, CA (US); Yunhan Ma, San Diego, CA (US); Bike Xie, San Diego, CA (US); Hsiang-Tsun Li, Taichung (TW); Junjie Su, San Diego, CA (US); Chun-Chen Liu, San Diego, CA (US)

(73) Assignee: Kneron (Taiwan) Co., Ltd., Taipei (TW)

( * ) Notice: Subject to any disclaimer, the term of this patent is extended or adjusted under 35 U.S.C. 154(b) by 1085 days.

(21) Appl. No.: 16/551,753

(22) Filed: Aug. 27, 2019

(65) Prior Publication Data
US 2020/0193270 A1 Jun. 18, 2020

Related U.S. Application Data

(60) Provisional application No. 62/778,299, filed on Dec. 12, 2018.

(51) Int. Cl.
*G06N 3/082* (2023.01)
*G06N 3/045* (2023.01)

(52) U.S. Cl.
CPC ............ *G06N 3/082* (2013.01); *G06N 3/045* (2023.01)

(58) Field of Classification Search
None
See application file for complete search history.

(56) References Cited

U.S. PATENT DOCUMENTS

| 2018/0046903 A1* | 2/2018 | Yao | G06N 3/063 |
| 2018/0197081 A1* | 7/2018 | Ji | G06N 3/08 |
| 2019/0042948 A1* | 2/2019 | Lee | G06N 3/063 |
| 2019/0147322 A1* | 5/2019 | Kim | G06N 3/063 |
| | | | 706/16 |
| 2021/0019630 A1* | 1/2021 | Yao | G06N 3/045 |

OTHER PUBLICATIONS

Doyun Kim et al., "Convolutional Neural Network Quantization using Generalized Gamma Distribution", arXiv:1810.13329v1[cs.NE], pp. 1-10, Oct. 31, 2018.

Zhourui Song et al., "Computation Error Analysis of Block Floating Point Arithmetic Oriented Convolution Neural Network Accelerator Design", arXiv:1709.07776v2 [cs.LG], pp. 1-8, Nov. 24, 2017.

* cited by examiner

*Primary Examiner* — Abdullah Al Kawsar
*Assistant Examiner* — Asher H. Jablon
(74) *Attorney, Agent, or Firm* — Winston Hsu

(57) ABSTRACT

After inputting input data to a floating pre-trained convolution neural network to generate floating feature maps for each layer of the floating pre-trained CNN model, a statistical analysis on the floating feature maps is performed to generate a dynamic quantization range for each layer of the floating pre-trained CNN model. Based on the obtained quantization range for each layer, the proposed quantization methodologies quantize the floating pre-trained CNN model to generate the scalar factor of each layer and the fractional bit-width of a quantized CNN model. It enables the inference engine performs low-precision fixed-point arithmetic operations to generate a fixed-point inferred CNN model.

6 Claims, 1 Drawing Sheet

LOW PRECISION AND COARSE-TO-FINE DYNAMIC FIXED-POINT QUANTIZATION DESIGN IN CONVOLUTION NEURAL NETWORK

CROSS REFERENCE TO RELATED APPLICATIONS

This application claims the benefit of U.S. Provisional Application No. 62/778,299, filed Dec. 12, 2018 which is incorporated herein by reference.

BACKGROUND OF THE INVENTION

1. Field of the Invention

The invention is related to image processing, and more particularly, to a power efficient convolution neural network implementation.

2. Description of the Prior Art

Since the remarkable success of ImageNet competition, Convolution Neural Network (CNN) has become a popular structure for computer vision tasks. A typical pre-trained CNN model requires billions of accumulate operations, a huge amount of memory space, and several watts for a single inference. Limited computing resources and storage becomes an obstacle to run CNN on Internet of things (IoT) or portable devices.

There are three major challenges to develop a new CNN accelerator:

Spatially data transfer with limited memory storage: Due to limited memory storage (<320 KB SRAM) in IoT devices, the latency of a large amount of data transfer between an off-chip memory such as a dynamic random access memory (DRAM) and an on-chip memory such as a synchronous random access memory (SRAM) is not acceptable for real-time artificial intelligent (AI) applications.

Massive multiplications of CNN with high power consumption: To a real-time inference CNN model, massive multiplications require very high power consumption for arithmetic calculations, thus it is difficult to design a CNN to satisfy IoT devices' power requirement.

Re-training a CNN model requires a tremendous training dataset: The re-training CNN model process takes hours in the quantization approximation. This takes lots of arithmetic operations, thus cannot be implemented in a low power consumption device.

SUMMARY OF THE INVENTION

An embodiment provides a method of processing a convolution neural network. The method comprises inputting input data to a floating pre-trained convolution neural network (CNN) to generate floating feature maps for each layer of the floating pre-trained CNN model, inputting the floating feature maps to a statistical analysis simulator to generate a dynamic quantization range for each layer of the floating pre-trained CNN model. The method further comprises quantizing the floating pre-trained CNN model according to the dynamic quantization range for each layer of the floating pre-trained CNN model d results in a quantized CNN model, a scalar factor of each layer of the quantized CNN model, and a fractional bit-width of the quantized CNN model. The method further comprises inputting the quantized CNN model to an inference engine to generate a fixed-point inferred CNN model using fixed-point arithmetic operations with low-precision.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
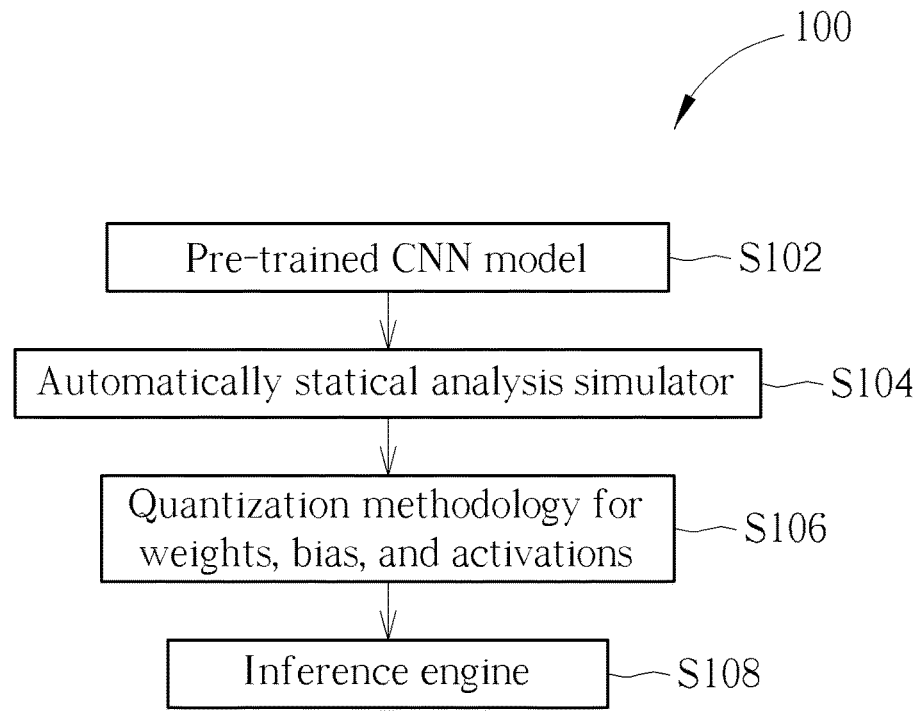
FIG. 1 is a flowchart of a method for processing a convolution neural network according to an embodiment.

FIG. 1 is a flowchart of a method 100 for processing a convolution neural network (CNN) according to an embodiment. The method 100 includes the following steps:

S102: inputting input data to a floating pre-trained convolution neural network (CNN) to generate floating feature maps for each layer of the floating pre-trained CNN model;

S104: inputting the floating feature maps to a statistical analysis simulator to generate a dynamic quantization range for each layer of the floating pre-trained CNN model;

S106: quantizing the floating pre-trained CNN model according to the dynamic quantization range for each layer of the floating pre-trained CNN model to generate a quantized CNN model, a scalar factor of each layer of the quantized CNN model, and a fractional bit-width of the quantized CNN model; and S108: inputting the quantized CNN model to an inference engine to generate a fixed-point CNN model using fixed-point arithmetic operations with low-precision.

Step S102 refers to the given input data to the pre-trained CNN model to generate floating feature maps for each layer of the floating pre-trained CNN model. The input data is multimedia data. Step S104 is performed by an automatic statistical analysis simulator. Step S106 refers to a quantization methodology for weights, biases and activations. Step S108 is performed by an inference engine to generate a fixed-point inferred CNN model using fixed-point arithmetic operations with low-precision. The fixed-point inferred CNN model can be inputted to the pre-trained convolution neural network.

In CNN operations, the entire computational overhead is dominated by convolutional (CONV) and fully connected operations (FC). By the general multiplication matrix (GEMM), the formulation of the CONV and FC is in equation 1. In the forward-passing process of the CNN model, the output features in i-th channel at the l-th layer can be expressed as:

$$x_i^{(l)} = \sum_{j=1}^{k \cdot k \cdot N} \omega_{i,j}^{(l)} x_j^{(l-1)} + b_i^{(l)} \qquad \text{equation 1}$$

where k represents the convolutional kernel size; N represents the total number of input channels; The output channel i equals $\{1, 2, \ldots, M\}$ where M is the total number of output channels. $b_i^{(l)}$ represents the bias value of i-th output channel at l-th layer. For an FC operation, the kernel size k always equals 1. To reduce the computational overhead of a large-scale CNN, this embodiment implements a quantization scheme, called dynamic fixed-point arithmetic operators, in equation 1. Thus, the quantization problem can be expressed as an optimization equation in equation 2.

$$\text{Min}\{\|\Sigma_{i=1}^{M}(Q(x_i^{(l)}-(x_i^{(l)})))\|^2\} \quad \text{equation 2}$$

where Q( ) is the quantization function using a round-to-nearest method, which can produce the lowest magnitude of rounding error.

Figure 2:
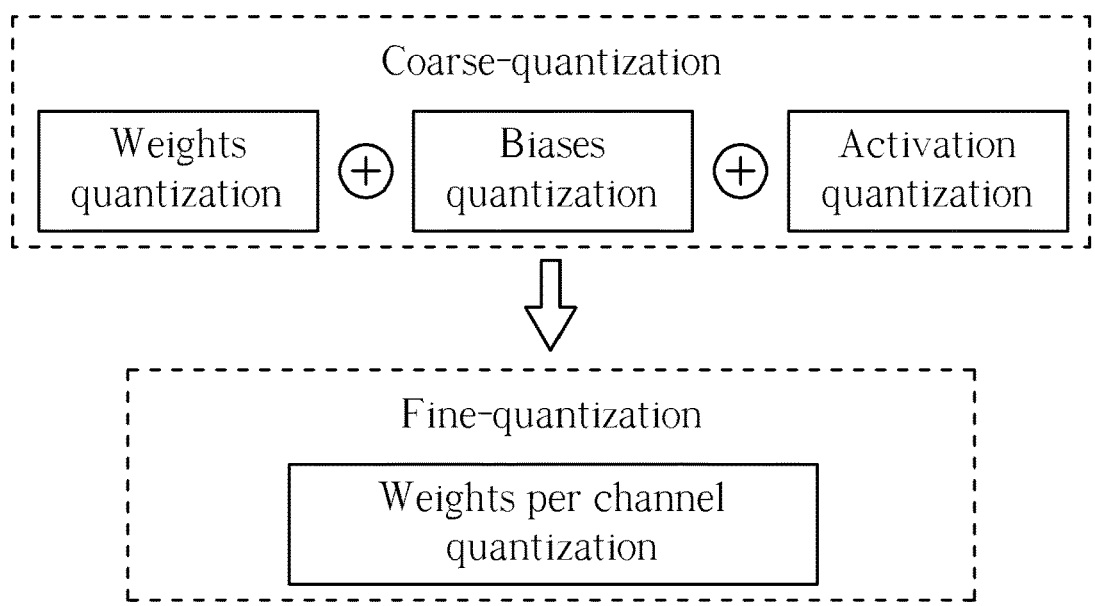
FIG. 2 shows quantization methodologies for weight and activation in FIG. 1.

In order to minimize the quantization errors in equation 2, equation 1 is reconsidered. Equation 1 has two major components. One is the weighting vectors ($\omega$ and b) and the other is the activation vector(x). To minimize the quantization errors in the weighting vectors ($\omega$ and b), coarse-to-fine dynamic fixed-point approximation is performed on the weighting vectors. To minimize the quantization errors in the activation vector(x), efficient fixed-precision representation on activations is applied. FIG. 2 shows quantization methodologies for weight and activations in FIG. 1.

An embodiment discloses a quantization methodology, a fixed-precision Representation on activation vector is described as below.

To fully represent the 32-bit floating-point value when using dynamic fixed-point format in the activation vector (x), a scalar factor s is defined as shown in equation 3.

$$s = \frac{2^{p-1}-1}{\max_v} \quad \text{equation 3}$$

where p represents the quantization bit-width. In equation 3, the dynamic quantization range is $[[-\max_v, \max_v]]$. From the perspective of activation vectors (x) in CONV and FC operations, the $\max_v$ is the statistical maximum value of a large set of typical input features. It can be analyzed by the statistical maximum value analysis in FIG. 1.

Based on equation 3, s is the scalar factor which bridges the gap between the floating point value and fixed-point value. The scalar factor s is the mathematical real number in 32-bit floating point format. Applying the scalar factor $s^{(l)}$ on the activation vector $x^l$ at l-th layer, equation 1 can be re-written as:

$$s^{(l)} \cdot x^{(l)} = \sum_{j=1}^{k \cdot k \cdot N} s^{(l)} \cdot \omega_j^{(l)} x^{(l-1)} + s^{(l)} \cdot b^{(l)}$$

After doing the multiplying operation in equation 1, the quantization problem expressed as equation 2 can be re-written as follows:

$$\text{Min}\left\{\left\|\left(\sum_{i=1}^{M}(Q(s^{(l)} \cdot x_i^{(l)}) - (s^{(l)} \cdot x_i^{(l)}))\right)\right\|^2\right\}$$

For each layer in CNN model, it has its own scalar factor $s^{(l)}$ at l-th layer. Multiplying the scalar factor s on the activation vector can efficiently cover the entire quantization range $[[-2^{p-1}, 2^{p-1}-1]]$. The quantization error is thus minimized.

An embodiment discloses a quantization methodology, a coarse quantization and a fine quantization by the dynamic quantization range on weight vector is described as below.

In equation 3, the dynamic quantization range is $[[-\max_v, \max_v]]$ in weight vectors. From the perspective of weighting vector ($\omega$ and b) in CONV and FC operations, the $\max_v$ equals $\max(|\min(w)|, |\max(w)|)$ where $|\max(w)|$ and $|\min(w)|$ are the absolute maximum value of weights and the absolute minimum value of weights, respectively. "|x|" represents the absolute value of x. According to equation 1, once the scalar factor s is multiplied on the activation vector for each layer, it can impact on the weight vectors when doing the dynamic fixed-point approximation. To handle this issue, a coarse quantization and a fine quantization to fixed-point technique on weight vectors is proposed.

Firstly, for each layer, the scalar factor s mentioned in equation 3 is expressed as:

$$s = q \cdot 2^n = \frac{2^{p-1}-1}{\max_v(x)}$$

where q equals $$\frac{s}{2^n}.$$

n is the number of fractional bits, which represent the fractional word length defined as:

$$n = \left\lfloor \log_2 \frac{2^{p-1}-1}{\max_v(x)} \right\rfloor$$

Note that the $2^n$ is the integer value and q is the 32-bit floating value q∈.

In the weight vectors, it has a convolutional vector or batch-normalization scaling vector ($\omega$) and a bias vector (b). From the perspective of a bias vector ($b^l$) at l-th layer, the updated bias vector can be updated as $q^l \cdot b$ due to the scaled activation vector. From the perspective of a convolutional or batch-normalization scaling weight vector ($w^{(l)}$) at l-th layer, considering the activation vector is iteratively updated by the scalar factors at each layer, the convolutional weight vector at l-th layer ($w^{(l)}$) should be updated as $$\frac{q^{(l)} \cdot w^{(l)}}{q^{(l-1)}} \text{ when } l >= 1.$$

When l=0, the updated weight vector is $q^{(0)} \cdot w^{(0)}$. For layers without weight vectors, such as activation and pooling layers, the floating scalar factor from its input layer is passed on to its following layers.

According to the statistical analysis on the convolutional weight vector ($w_{(k \times k \times N \times M) \times 1}$), the values for each output channel (the total number of output channels is M) vary differently. The quantization accuracy will thus be significantly impacted when the dynamic quantization range $([-\max_v(w), -\max_v(w)])$ is used to cover the entire output channels. To solve this problem, the fine quantization technique is used on channel-wised quantization. In the convolutional weight vector, the maximum value for i-th output channel is defined as $\max_v(w_i)(i \in 1, 2, \ldots, M)$. The updated dynamic range per output channel is $[-\max_v(w_i), \max_v(w_i)]$. Applying the coarse quantization and the fine quantization by quantization range to generate fixed-point inferred data, it can provide the very low quantization error and provide a quantization result close to 32-bit floating point accuracy for all CNNs.

The invention provides a method of processing a convolution neural network. The method comprises inputting input data to a pre-trained convolution neural network (CNN) to generate floating feature maps for each layer of the floating pre-trained CNN model, inputting the floating feature maps to a statistical analysis simulator to generate a dynamic quantization range for each layer of the floating pre-trained CNN model, quantizing the floating pre-trained CNN model according to the dynamic quantization range for each layer of the floating pre-trained CNN model to generate a quantized CNN model, a scalar factor of each layer of the quantized CNN model, and a fractional bit-width of the quantized CNN model, and inputting the quantized CNN model to an inference engine to generate a fixed-point inferred CNN model using fixed-point arithmetic operations with low-precision. Applying the proposed techniques, the fixed-point inferred CNN model is built to be used on limited memory size and low arithmetic capability devices such as mobile phone or portable IoT devices without performance loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of quantizing a floating pre-trained convolution neural network (CNN) model comprising:
    inputting input data to the floating pre-trained CNN model to generate floating feature maps for each layer of the floating pre-trained CNN model;
    inputting the floating feature maps to a statistical analysis simulator to generate a dynamic quantization range for each layer of the floating pre-trained CNN model; and
    quantizing the floating pre-trained CNN model according to the dynamic quantization range for each layer of the floating pre-trained CNN model to generate a quantized CNN model, a scalar factor of each layer of the floating pre-trained CNN model, and a fractional bit-width of the quantized CNN model, wherein quantizing the floating pre-trained CNN model comprises:
        acquiring a plurality of weights of each layer of the floating pre-trained CNN model;
        setting the scalar factor of each layer of the floating pre-trained CNN model according to a maximum weight of the plurality of weights and a minimum weight of the plurality of weights;
        applying the scalar factor of each layer of the floating pre-trained CNN model to an activation vector at each layer of the floating pre-trained CNN model; and
        minimizing a quantization error of each layer of the quantized CNN model according to the scalar factor by using a minimum mean square error approach as $$\mathrm{Min}\left\{\left\|\left(\sum_{i=1}^{M}(Q(s^{(l)} \cdot x_i^{(l)}) - (s^{(l)} \cdot x_i^{(l)}))\right)\right\|^2\right\},$$

wherein $s^{(l)}$ is the scalar factor at an l-th layer, $x_i^{(l)}$ represents output features in an i-th channel at the l-th layer, $Q(\ )$ is a quantization function, and M is a total number of channels;
        wherein the scalar factor of each layer of the floating pre-trained CNN model is associated with a quantization bit-width and the dynamic quantization range when quantizing the floating pre-trained CNN model.

2. The method of claim 1, wherein the quantizing the floating pre-trained CNN model further comprises:
    performing a first quantization over the floating pre-trained CNN model according to the dynamic quantization range for each layer of the floating pre-trained CNN model to generate a first CNN model; and
    performing a second quantization on all channels of convolution (CONV) layers and/or fully-connected (FC) layers of the first CNN model to generate the quantized CNN model.

3. The method of claim 2, wherein performing the first quantization over the floating pre-trained CNN model according to the dynamic quantization range for each layer of the floating pre-trained CNN model to generate the first CNN model comprises:
    performing an activation quantization process, a bias quantization process, and a weight quantization process to generate the first CNN model.

4. The method of claim 3, wherein performing the activation quantization process, the bias quantization process and the weight quantization process to generate the first CNN model comprises:
    performing the activation quantization process over the floating pre-trained CNN model to generate quantized activations;
    performing the bias quantization process over bias data of the floating pre-trained CNN model to generate a quantized bias; and
    performing the weight quantization process over the weight data of the floating pre-trained CNN model to generate quantized weights.

5. The method of claim 2, wherein performing the second quantization on all channels of convolution (CONV) layers and/or fully-connected (FC) layers of the first CNN model to generate the quantized CNN model comprises:
    performing a weight per channel quantization process over all channels of convolution (CONV) layers and/or fully-connected (FC) layers of the first CNN model to generate the quantized CNN model which comprises a quantized weight per channel.

6. The method of claim 1, wherein the input data is multimedia data.

* * * * *